US009289910B2

(12) United States Patent
Sato et al.

(10) Patent No.: US 9,289,910 B2
(45) Date of Patent: Mar. 22, 2016

(54) METHOD OF PROCESSING RIDGE OF CUTTING EDGE AND INSTRUMENT WITH PROCESSED RIDGE OF CUTTING EDGE

(71) Applicant: JAPAN AVIATION ELECTRONICS INDUSTRY, LIMITED, Tokyo (JP)

(72) Inventors: Akinobu Sato, Tokyo (JP); Akiko Suzuki, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 0 days.

(21) Appl. No.: 13/908,293

(22) Filed: Jun. 3, 2013

(65) Prior Publication Data

US 2014/0007752 A1 Jan. 9, 2014
US 2014/0182440 A9 Jul. 3, 2014

(30) Foreign Application Priority Data

Jul. 4, 2012 (JP) ................................. 2012-150674

(51) Int. Cl.
B26D 1/00 (2006.01)
C03B 33/10 (2006.01)
B28D 1/22 (2006.01)

(52) U.S. Cl.
CPC .............. *B26D 1/0006* (2013.01); *B28D 1/225* (2013.01); *C03B 33/105* (2013.01); *B26D 2001/002* (2013.01); *B26D 2001/0053* (2013.01); *Y02P 40/57* (2015.11); *Y10T 83/929* (2015.04)

(58) Field of Classification Search
CPC ................................ B26D 1/0006; B26D 1/00
USPC ....................................................... 264/488
See application file for complete search history.

(56) References Cited

U.S. PATENT DOCUMENTS

2009/0198264 A1 8/2009 Svrluga et al.
2010/0230616 A1 9/2010 Suzuki et al.

FOREIGN PATENT DOCUMENTS

| CN | 101548366 | 9/2009 |
| JP | H05-172709 | 7/1993 |
| JP | 2004-058168 | 2/2004 |
| JP | 2005-224419 | 8/2005 |
| JP | 2008-112523 | 5/2008 |
| JP | 2010-036297 | 2/2010 |
| JP | 2011-512173 | 4/2011 |
| WO | 2005/031838 | 4/2005 |
| WO | 2009-100006 | 8/2009 |

OTHER PUBLICATIONS

Bibliographic Information Sheet for JP3994111, published Oct. 17, 2007.
Chinese Office Action in counterpart application No. 201310271165.8; mail date Feb. 13, 2015.

*Primary Examiner* — Christina Johnson
*Assistant Examiner* — Xue Liu
(74) *Attorney, Agent, or Firm* — Greenblum & Bernstein, P.L.C.

(57) ABSTRACT

Two surfaces forming a cutting edge and a ridge of a cutting edge existing along the boundary between the two surfaces intersecting with each other are irradiated with a gas cluster ion beam at the same time, the maximum height of the profile of the two surfaces being equal to or smaller than 1 μm. A facet is newly formed on the ridge of the cutting edge by performing the irradiation with the gas cluster ion beam in such a manner that the two surfaces are not perpendicularly but obliquely irradiated with the gas cluster ion beam, and at least a part of the ridge of the cutting edge is perpendicularly irradiated with the gas cluster ion beam.

7 Claims, 6 Drawing Sheets

METHOD OF PROCESSING RIDGE OF CUTTING EDGE AND INSTRUMENT WITH PROCESSED RIDGE OF CUTTING EDGE

TECHNICAL FIELD

The present invention relates to a method of processing a ridge of a cutting edge and an instrument with a processed ridge of the cutting edge that can be applied to a wide variety of instruments having a cutting edge, such as machining instruments including cutting tools and cutters, cooking instruments including kitchen knives, and medical instruments including scalpels.

BACKGROUND ART

As well known, the performance of a cutting edge largely depends on into what shape the ridge of the cutting edge is processed. As the ridge becomes sharper, the cutting ability improves while the durability tends to deteriorate, such as a chip being more likely to occur on the ridge. In order to improve the durability or to prevent a material from being snagged on the ridge, it is common practice to round the ridge. For example, Patent Literature 1 (Japanese Patent Application Laid-Open No. 2008-112523) discloses an example in which an edge of a glass disk is rounded by wet etching. Patent Literature 2 (Japanese Patent Application Laid-Open No. 2005-224419) discloses an example in which the cutting edges of a pair of scissors are rounded by lapping.

Furthermore, it is also common practice to perform beveling, such as forming a facet or chamfer, in order to increase the strength of the ridge of the cutting edge. For example, Patent Literature 3 (Japanese Patent Application Laid-Open No. 2004-58168) discloses an example in which a chamfer is formed on a cutting edge. If the beveling is performed to form the facet or the chamfer, the durability can be improved without significantly deteriorating the cutting ability.

As a method of precisely polishing areas smaller than the areas to which the wet etching and the lapping can be applied, a method of using a gas cluster ion beam has been proposed. Patent Literature 4 (Japanese Patent Application Laid-Open No. 2011-512173) discloses an example in which a surgical scalpel is irradiated with a gas cluster ion beam to sharpen the ridge thereof. The energy of the gas cluster ion beam is more concentrated in the vicinity of the surface of the material than the monomer ion beam, and therefore, the gas cluster ion beam has an advantage that it can achieve low-damage processing. Therefore, even an extremely sharp cutting edge can be processed without doing damage, such as small cracks, to the cutting edge.

Furthermore, Patent Literature 5 (Japanese Patent Application Laid-Open No. 2010-36297) discloses a result of irradiation of a cutting edge with a gas cluster ion beam. This literature proposes a method of using a gas cluster ion beam to smooth the surface of a diamond coating film the maximum height Rz of the profile in a 10-μm square of which is greater than 1 (Rz is defined according to Japanese Industrial Standards B0601:2001. The maximum height Rz of the profile is a sum of the maximum value of the profile peak height Zp from the average line of the contour curve and the maximum value of the profile valley depth Zv from the average line). As influences on the ridge of the cutting edge, it is shown that the chamfers originally formed on the diamond-coated tool remain, the ridge of the cutting edge is not rounded after the irradiation with the gas cluster ion beam, and the surface roughness does not significantly change even if the ridge of the cutting edge is perpendicularly irradiated with the gas cluster ion beam.

If a crystal material is etched by wet etching or monomer ion beam etching, a certain crystal face may selectively appear because of the anisotropy of the crystal material. In some cases, the anisotropy can be effectively used. However, if wet etching or monomer ion beam etching is used for a precise instrument, there arises a problem that the shape of the ridge of the cutting edge cannot be controlled as desired. In the case of an amorphous material rather than the crystal material, there is a problem that the etching may be nonuniform because of a phase separation or various defects in the material, and the nonuniformity significantly decreases the mechanical durability of the cutting edge.

Lapping or other similar art is a process of shaving the surface of the material of the cutting edge with abrasive grain and therefore inevitably does fine damage to the surface of the material of the cutting edge when shaving the surface with the abrasive grain and decreases the mechanical durability of the cutting edge.

If a facet or a chamfer (collectively referred to as a facet hereinafter) is formed on the ridge of the cutting edge for beveling, the mechanical durability may be improved to some extent. However, as far as this process is performed by using a conventional art, such as wet etching, monomer ion beam etching, laser beam machining or lapping, there is a problem that a small scratch or crack or a brittle affected layer occurs in the facet, and the adequate mechanical durability cannot be achieved.

The gas cluster ion beam art can achieve low-damage processing. However, only art for sharpening a cutting edge has been disclosed yet. If the cutting edge is sharpened, there is a problem that the mechanical durability of the cutting edge tends to be inadequate. Although the ridge of the cutting edge can be made blunt by using the gas cluster ion beam art, there is a problem that simply making the ridge of the cutting edge blunt increases the cutting resistance or otherwise decreases the cutting ability.

Patent Literature 5 discloses a result of irradiation of a cutting edge with a gas cluster ion beam as described above. According to Patent Literature 5, however, the surface of a diamond coating film the maximum height of the profile of which in a 10-μm square is greater than 1 μm is planarized with the gas cluster ion beam, and a facet cannot be formed on the surface even though the surface can be planarized. In addition, Patent Literature 5 does not propose any processing method that can precisely control the shape of a ridge of a cutting edge.

As described above, there has been proposed no conventional processing method that can precisely control the shape of a ridge of a cutting edge and form an ideal facet without doing even fine damage to a cutting edge.

SUMMARY OF THE INVENTION

In view of such circumstances, an object of the present invention is to provide a processing method that can achieve low-damage processing and form an ideal facet on a ridge of a cutting edge, and an instrument having a ridge of a cutting edge processed in the processing method.

According to a method of processing a ridge of a cutting edge according to a first aspect of the present invention, two surfaces forming a cutting edge and a ridge of a cutting edge existing along a boundary between the two surfaces intersecting with each other are irradiated with a gas cluster ion beam, the maximum height of the profile of the two surfaces being equal to or smaller than 1 μm, and a facet is newly formed on the ridge of the cutting edge by performing the irradiation with the gas cluster ion beam in such a manner that the two surfaces are not perpendicularly but obliquely irradiated with the gas cluster ion beam, and at least a part of the ridge of the cutting edge is perpendicularly irradiated with the gas cluster ion beam.

According to a second aspect of the present invention, in the first aspect, a planarization processing for reducing the maximum height of the profile of the two surfaces to be equal to or smaller than 1 μm is performed by irradiation with the gas cluster ion beam.

According to a third aspect of the present invention, in the first or second aspect, a gas that does not chemically react with a material of the cutting edge is used as a gas of the gas cluster ion beam.

According to a fourth aspect of the present invention, in the third aspect, the gas is any of argon, oxygen, nitrogen, carbon dioxide or a combination thereof.

An instrument according to a fifth aspect of the present invention has a ridge of a cutting edge processed in a method of processing a ridge of a cutting edge according to any of the first to fourth aspects of the present invention.

According to a sixth aspect of the present invention, in the fifth aspect, a plurality of facets are formed.

According to a seventh aspect of the present invention, in the fifth or sixth aspect, at least a part of the facet(s) is a curved surface.

EFFECTS OF THE INVENTION

The method of processing a ridge of a cutting edge according to the present invention can form an ideal facet on a ridge of a cutting edge with low damage. Therefore, a cutting edge having high cutting ability and high durability can be manufactured with high productivity.

BRIEF DESCRIPTION OF THE DRAWINGS

FIG. 1 are schematic diagrams for illustrating how an inclined surface is formed on an edge by irradiating the edge with a gas cluster ion beam, in which FIG. 1(a) shows how a corner of a material is shaved, FIG. 1(b) shows how a lateral movement of a substance occurs in the vicinity of the corner of the material, FIG. 1(c) shows how the corner of the material is further shaped, and FIG. 1(d) shows an inclined surface formed at the corner of the material;

FIG. 2 are schematic diagrams for illustrating formation of a facet by irradiation of an edge with the gas cluster ion beam, in which FIG. 2(a) shows how a cluster flows along the inclined surface, and FIG. 2(b) shows how the inclined surface is planarized;

FIG. 3 are schematic diagrams showing that a facet is formed when the surface roughness of the surfaces irradiated with the gas cluster ion beam is low, in which FIG. 3(a) shows the material before irradiation with the gas cluster ion beam, and FIG. 3(b) shows the material after irradiation with the gas cluster ion beam;

FIG. 4 are schematic diagrams showing that no facet is formed when the surface roughness of the surfaces irradiated with the gas cluster ion beam is high, in which FIG. 4(a) shows the material before irradiation with the gas cluster ion beam, and FIG. 4(b) shows the material after irradiation with the gas cluster ion beam;

FIG. 5 are schematic diagrams for illustrating how facets are formed on a ridge of the cutting edge by irradiation with the gas cluster ion beam, in which FIG. 5(a) shows how a cutting edge is irradiated with the gas cluster ion beam, FIG. 5(b) shows the ridge of the cutting edge in an early phase of the irradiation with the gas cluster ion beam, FIG. 5(c) shows the ridge of the cutting edge in a later phase of the processing than the phase shown in FIG. 5(b), FIG. 5(d) shows the ridge of the cutting edge in a later phase of the processing than the phase shown in FIG. 5(c), FIG. 5(e) shows the ridge of the cutting edge in a later phase of the processing than the phase shown in FIG. 5(d), and FIG. 5(f) shows the cutting edge after irradiation with the gas cluster ion beam;

FIG. 6 are diagrams for illustrating facets formed in the case where two surfaces forming the cutting edge are irradiated with the gas cluster ion beam at equal irradiation angles, in which FIG. 6(a) shows the cutting edge before irradiation with the gas cluster ion beam, and FIG. 6(b) shows the cutting edge after irradiation with the gas cluster ion beam;

FIG. 7 are diagrams for illustrating facets formed in the case where two surfaces forming the cutting edge are irradiated with the gas cluster ion beam at different irradiation angles, in which FIG. 7(a) shows the cutting edge before irradiation with the gas cluster ion beam, and FIG. 7(b) shows the cutting edge after irradiation with the gas cluster ion beam;

FIG. 8 are diagrams for illustrating Example 1, in which FIG. 8(a) is a picture showing an initial state of the ridge of the cutting edge observed from above, FIG. 8(b) is an enlarged picture of FIG. 8(a), FIG. 8(c) is a diagram showing a side view of the cutting edge shown in FIG. 8(b), FIG. 8(d) is a picture showing the ridge of the cutting edge after irradiation with the gas cluster ion beam observed from above, and FIG. 8(e) is a diagram showing a side view of the cutting edge shown in FIG. 8(d);

FIG. 9 are diagrams for illustrating Example 1, in which FIG. 9(a) is a picture showing a state of the ridge of the cutting edge after irradiation with the gas cluster ion beam observed from one side, FIG. 9(b) is a picture showing the state of the ridge of the cutting edge shown in FIG. 9(a) observed from above, FIG. 9(c) is a sketch of the cutting edge shown in FIG. 9(a), and FIG. 9(d) is a sketch of the ridge of the cutting edge shown in FIG. 9(b); and FIG. 10 are diagrams showing details of FIG. 9, in which FIG. 10(a) is an enlarged picture of FIG. 9(a), and FIG. 10(b) is a sketch of the ridge of the cutting edge shown in FIG. 10(a).

DETAILED DESCRIPTION OF THE EMBODIMENTS

First, circumstances leading to the present invention and important points of the present invention will be described.

The most important point of the present invention is that a new phenomenon has been found in which (two) facets are formed on a ridge of a cutting edge when the ridge of the cutting edge is irradiated with gas cluster ion beam (abbreviated as GCIB hereinafter).

According to the conventional knowledge, a cutting edge irradiated with GCIB is sharpened (see Patent Literature 4), can or may become blunt (a brief mention about this phenomenon is found in Patent Literature 4), or is planarized (see Patent Literature 5).

The cutting edge is sharpened probably because of the shaping effect of GCIB depending on the irradiation direction (i.e., only the irradiated part is shaved) or because of the anisotropy of the sputtering amount. The cutting edge becomes blunt probably because of the lateral sputtering effect (like shaving a peak and filling in a valley with the shavings). The cutting edge is planarized probably because a projection is selectively irradiated with GCIB and is selectively polished out (owing to the shaping effect of oblique irradiation).

However, a modification to a process of GCIB irradiation can enable efficient use of the "asymmetric lateral movement of a substance on an edge", thereby enabling formation of a facet. The inventors have found this fact and a mechanism concerning the phenomenon.

Figure 1:
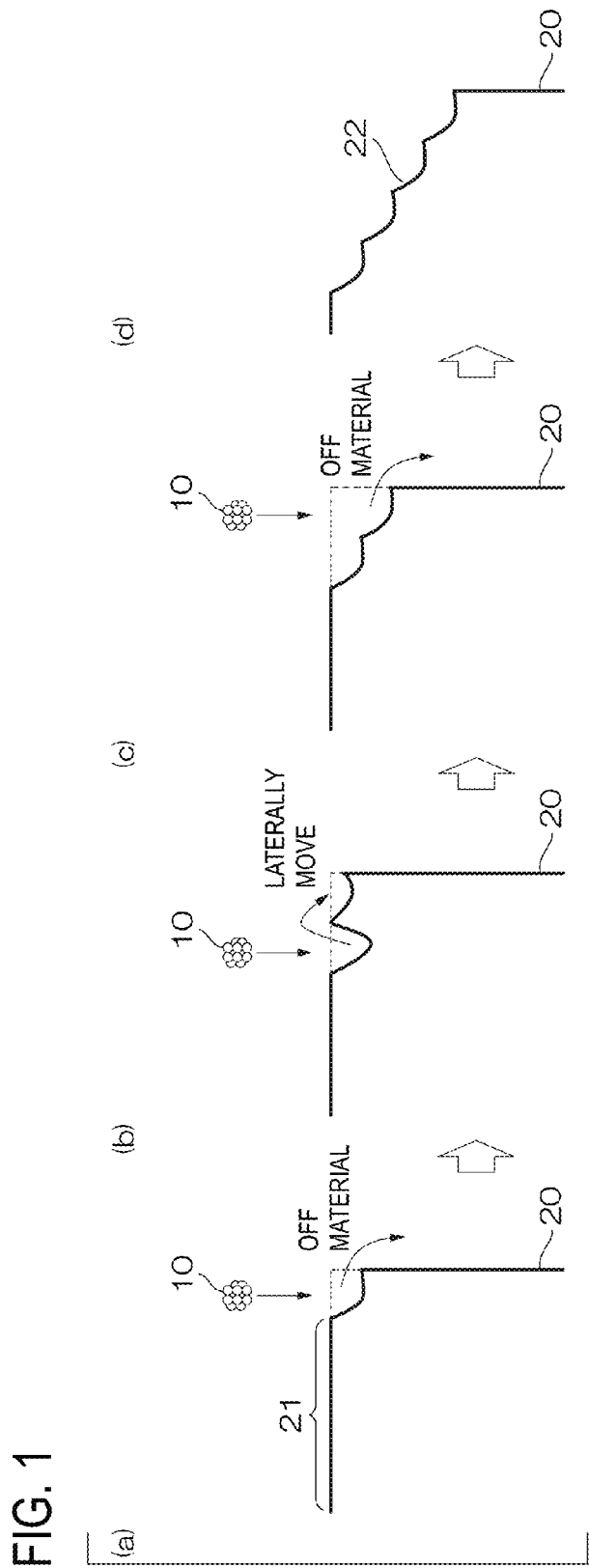
Figure 2:
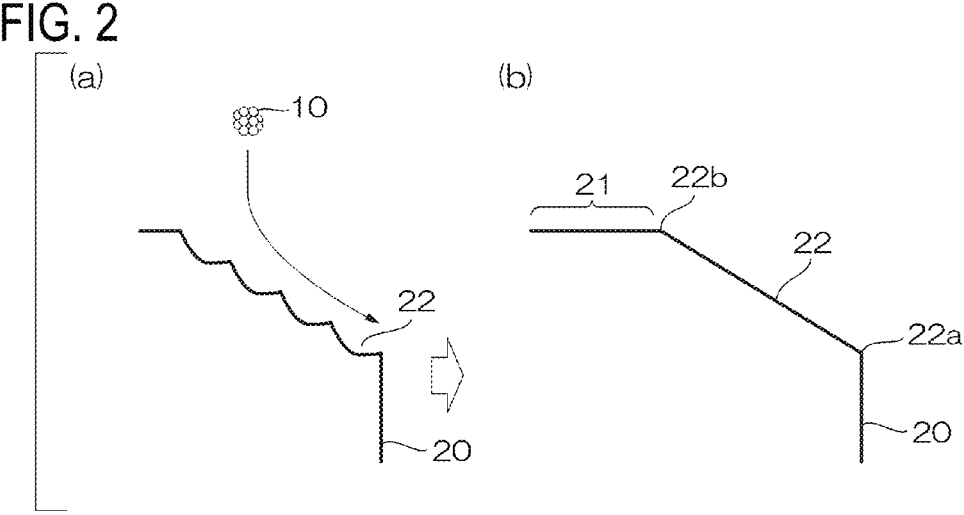

FIG. 1 show a mechanism of asymmetric lateral movement of a substance on an edge, and FIG. 2 show a mechanism of formation of a facet on an edge. In FIGS. 1 and 2, reference numeral 10 denotes a cluster in GCIB, and reference numeral 20 denotes a material irradiated with GCIB.

With a conventional planarization model, it is impossible to see what occurs when an edge of a material is irradiated with GCIB. However, if an edge of a material is irradiated with GCIB under certain conditions, an inclined surface is formed on the edge. This occurs through the mechanism of asymmetric lateral movement of a substance shown in FIG. 1.

More specifically, when an edge of the material 20 is irradiated with GCIB under certain conditions, the substance on the surface moves while maintaining the planarity of a region 21 as shown in FIGS. 1(a) to 1(d). Once an inclined surface 22 is formed on the edge as shown in FIGS. 1(d) and 2(a), the cluster 10 flows along the inclined surface 22, so that the inclined surface 22 grows so as to increase the length thereof. In other words, the substance on the surface of the material moves so as to increase the local planar area of the material surface. In addition, the flow of the cluster 10 shown in FIG. 2(a) sharpens the edges of ends 22a and 22b of the inclined surface 22. In FIG. 2(b), the planarity of the region 21 is maintained.

To form successive facets by using the asymmetric lateral movement of a substance on an edge, the surface roughness of the faces forming the edge on which the facets are to be formed needs to be small. The required surface roughness cannot be easily estimated from conventionally available information. However, it can be guessed that the surface roughness can be greater than 10 nm, which is approximately the size of a crater formed by one cluster in GCIB. For example, if the maximum height Rz of the profile is several tens nanometers, planarization can probably be relatively easily made to progress by GCIB irradiation. What occurs in the case where the surface roughness of the faces forming the edge is greater than the above-described level can be guessed as follows by earnest investigation.

Figure 3:
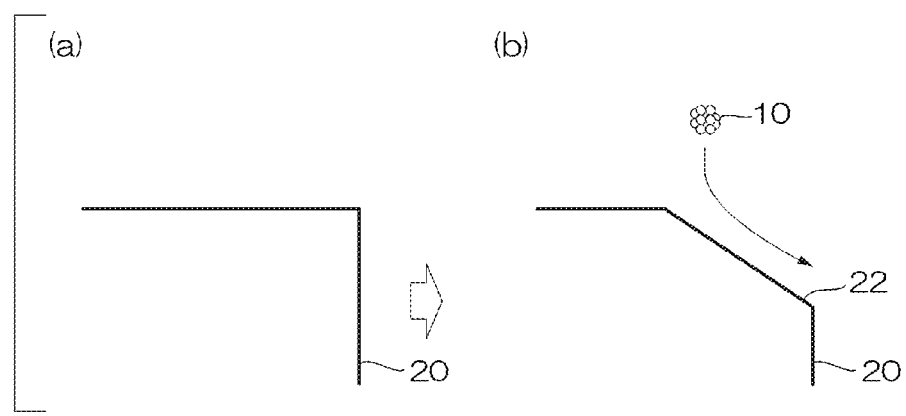
Figure 4:
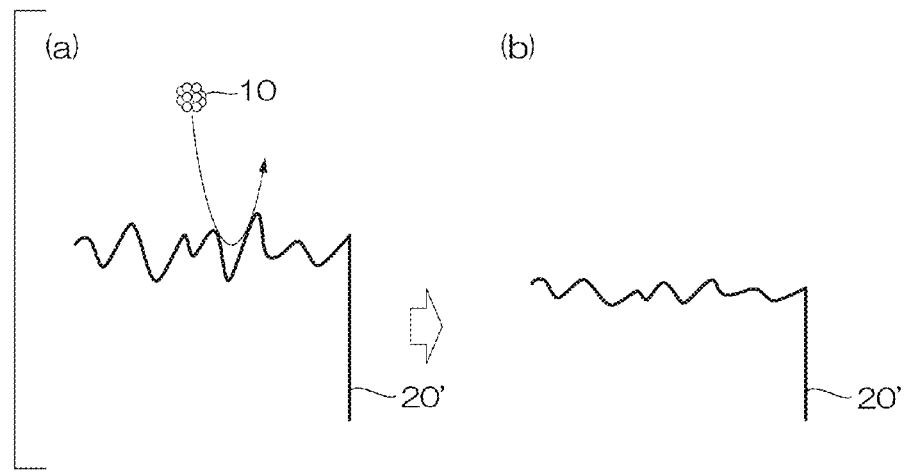

A high surface roughness means that there are great irregularities of some kind. The irregularities on the surface themselves act as edges. And the asymmetric lateral movement of a substance occurs on each of the edges formed by the irregularities. That is, the asymmetric lateral movement of a substance occurs not only on the edge of the material but also on every smaller edge-like part on the surfaces forming the edge. Under such a condition, a continuous surface to form a facet cannot grow, and therefore, a facet is not formed. Whether a facet is formed or not depends on whether a flow of the cluster along an inclined surface of the edge is formed or not. If the surface roughness is low, a flow of the cluster 10 along an inclined surface (the inclined surface 22) of the edge is formed as shown in FIG. 3. However, if the surface roughness is high, no flow of the cluster 10 is formed along an inclined surface of the edge, and no facet is formed as shown in FIG. 4.

By various investigations, the inventors have proved that the maximum height Rz of the profile as an indicator of the surface roughness is desirably equal to or smaller than 1 µm in order for a continuous surface to form a facet to grow.

However, if a common approach, such as increasing the dose, results in formation of a facet, the effect of the present invention is achieved. And of course, an important point of the present invention is that a facet is newly formed on a ridge of a cutting edge by irradiating the ridge of the cutting edge with GCIB.

Figure 5:
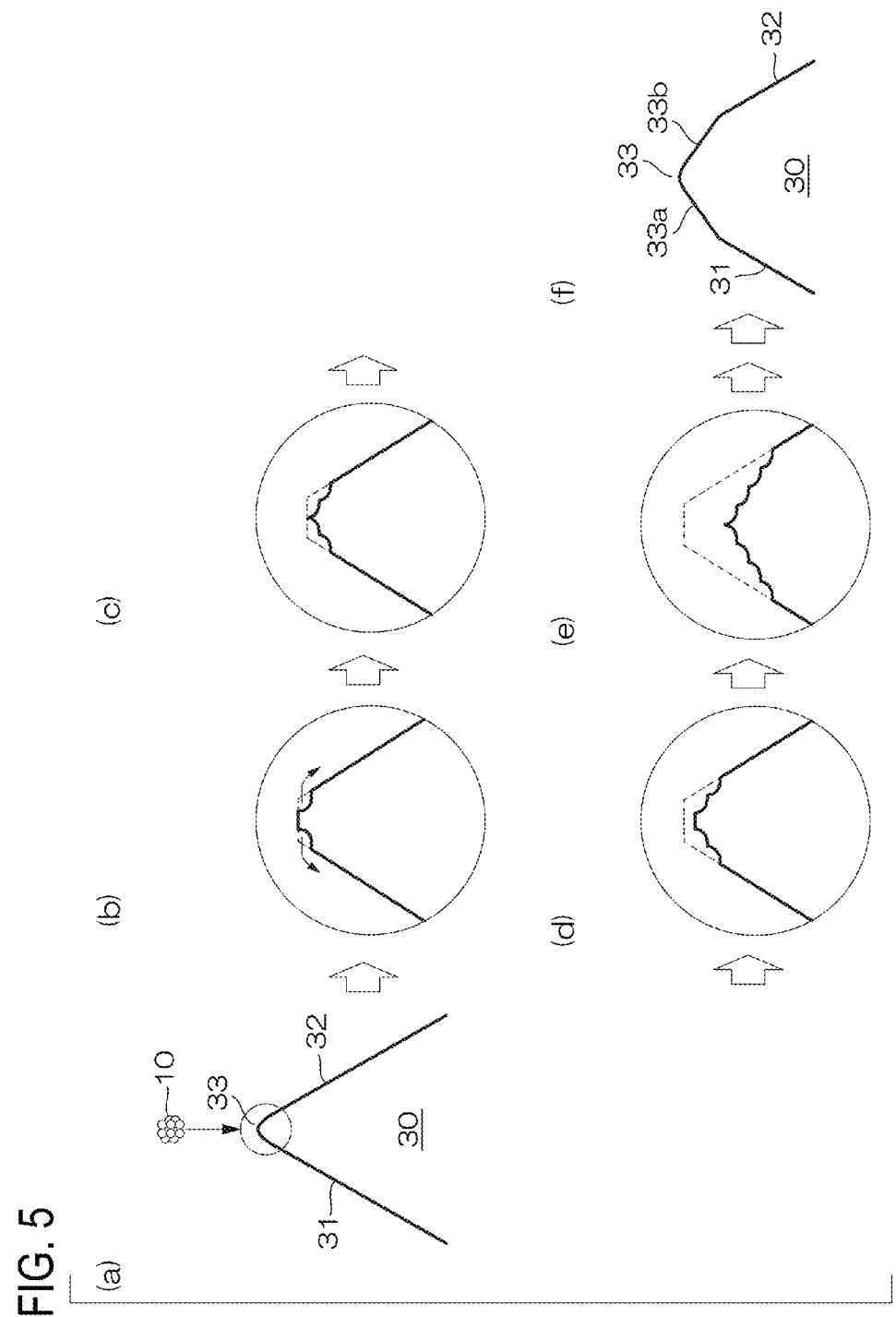

FIG. 5 are diagrams for illustrating a mechanism of the "asymmetric lateral movement of a substance" in the case where a ridge of a cutting edge is irradiated with GCIB. In FIG. 5, reference numeral 30 denotes a cutting edge, and reference numerals 31 and 32 denote two surfaces forming the cutting edge 30. Reference numeral 33 denotes a ridge of a cutting edge formed at the boundary between the two surfaces 31 and 32 intersecting with each other. As shown in FIG. 5(a), GCIB is applied to the two surfaces 31 and 32 and the ridge of the cutting edge 33 at the same time in such a manner that the GCIB is not perpendicularly but obliquely applied to the two surfaces 31 and 32 and is perpendicularly applied to at least a part of the ridge of the cutting edge 33. Upon irradiation with the GCIB, the substance on the surface moves as shown in FIGS. 5(b) to 5(e), and two facets 33a and 33b are formed on the ridge of the cutting edge 33 as shown in FIG. 5(f).

The facets 33a and 33b formed in this way are smoothly connected to the surfaces of the cutting edge 30 or, in other words, have an approximately curved surface, so that a stress concentration is unlikely to occur. This is an extremely important characteristic that contributes to increasing the mechanical durability. The approximately curved surface of the facet is essentially derived from the "asymmetric lateral movement of a substance" that occurs on an edge portion. This phenomenon first occurs on the edge portion to form an inclined surface. Once the inclined surface is formed, the lateral movement of the substance becomes more significant than when no inclined surface is formed. The inclined surface thus formed grows in such a manner that, referring to FIG. 2(b), the angle of inclination is essentially greater in parts closer to the end 22a of the inclined surface than in parts closer to the end 22b. On the other hand, a flow of GCIB is formed along the inclined surface as shown in FIG. 3(b) and acts to planarize the surface of the facet. The actual shape of the facet is determined by the balance between the competing actions. The surface of the facet essentially approximates to a curved surface by this mechanism. The original surfaces of the ridge of the cutting edge and the surfaces of the two facets produced are smoothly connected to each other in this way, so that a stress concentration is unlikely to occur, and the mechanical durability is improved. In addition, the conventionally known advantages of GCIB, the low-damage processing and the planarization effect, can also be provided, so that the mechanical durability is further improved.

By the way, one facet is formed in some cases, and two facets are formed in other cases. A possible reason for this is as follows.

The asymmetry of the lateral movement of a substance on an edge depends on the edge angle and the irradiation angle of GCIB. The greater the edge angle, the smaller the asymmetry becomes. And the smaller the edge angle, the greater the asymmetry becomes. The more inclined the irradiation angle of GCIB, the greater the movement of the substance in the direction of traveling of the beam becomes, and the smaller the movement of the substance in the opposite direction to the direction of traveling of the beam becomes. That is, the asymmetry of the lateral movement of the substance on the edge can be increased by increasing the angle of the irradiating GCIB with respect to the edge (or making the angle more inclined).

With this mechanism, if the two surfaces forming the ridge of the cutting edge are irradiated with GCIB at equal angles, two facets are likely to be formed. To the contrary, if one of the two surfaces forming the ridge of the cutting edge is irradiated with GCIB at a greater (or smaller) angle than the other, one facet is likely to be formed. In addition, in the case where two facets are formed, the two facets can be asymmetrically formed so as to have different shapes, such as different widths, by controlling the angle of the GCIB applied to the ridge of the cutting edge.

Figure 6:
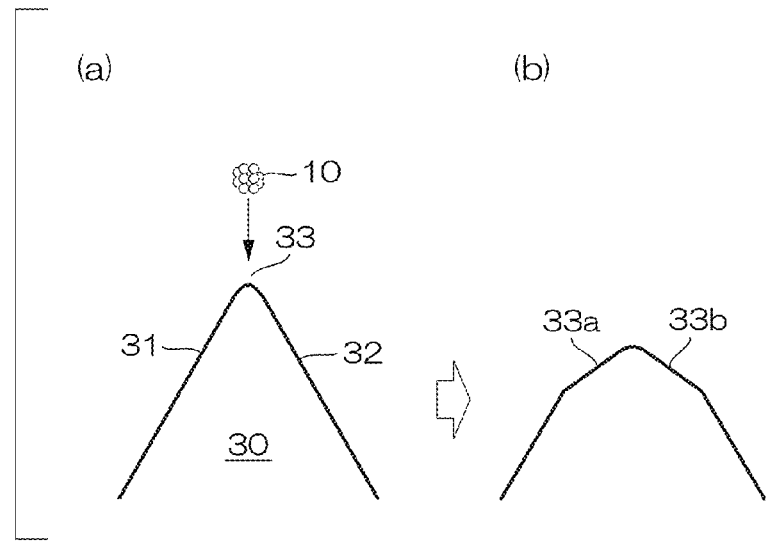
Figure 7:
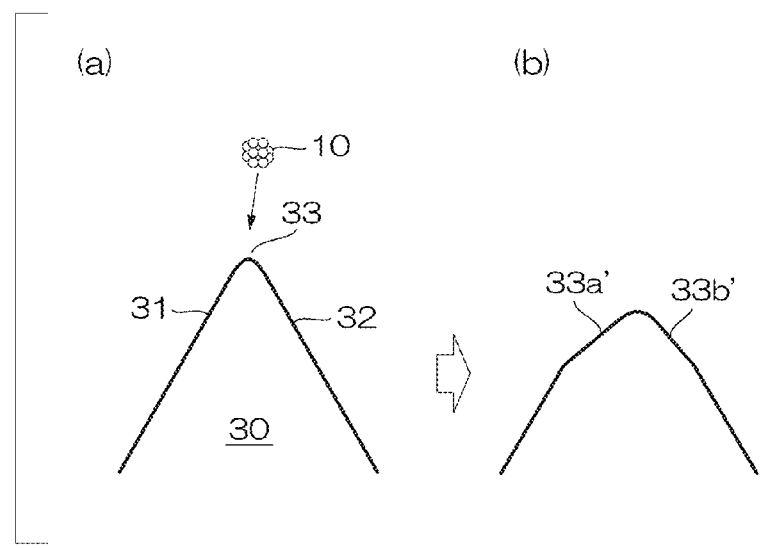

FIGS. 6 and 7 show how the shapes of two facets vary depending on the irradiation angle of GCIB. FIG. 6 show a case where the two surfaces 31 and 32 forming the cutting edge 30 are irradiated with GCIB at equal irradiation angles. In this case, the two facets 33a and 33b are symmetrically formed. On the other hand, FIG. 7 show a case where the two surfaces 31 and 32 forming the cutting edge 30 are irradiated with GCIB at different angles. In this case, two facets 33a' and 33b' are asymmetrically formed as shown in FIG. 7(b).

In order that the asymmetric lateral movement of the substance on the edge occurs to form facets, the maximum height Rz of the profile of the surface of the cutting edge irradiated with GCIB is desirably equal to or smaller than 1 μm. However, if the surface planarization effect of the GCIB irradiation can be used, a surface the maximum height Rz of the profile of which is equal to or greater than 1 μm can be planarized by GCIB irradiation to reduce the maximum height Rz of the profile to be equal to or smaller than 1 μM, and then facets can be formed on the surface by the effect of the present invention.

Next, how the processing can be sped up will be described.

According to the conventional knowledge concerning the GCIB technology, measures to increase the dose per unit time tend to be taken, such as increasing the acceleration voltage, increasing the gas pressure, or using the chemical reactivity. However, such measures will not work. Increasing the acceleration voltage or using the chemical reactivity leads rather to an increase of the sputtering rate than to an increase of the lateral movement of the substance, and thus provides adverse effects. In order to effectively achieve the asymmetric lateral movement of the substance on the edge described above, which is an important point of the present invention, the tradeoff between the sputtering and the lateral movement of the substance is important.

Specifically, if the sputtering is reduced while the lateral movement of the substance is increased, facets can be efficiently formed by reducing the etching amount of the cutting edge, which is a characteristic of the present invention. A possible approach to achieve this is to reduce the chemical reactivity of the material of the cutting edge with GCIB. If the material of the cutting edge chemically reacts with GCIB, the apparent sputtering rate increases. In this respect, a gas for GCIB is preferably an inert gas, which has no chemical reactivity with any material. Alternatively, combinations of an oxide or a nitride, as the material of the cutting edge, and oxygen or nitrogen, as the gas for GCIB, are also preferred since oxygen and nitrogen are less likely to react with oxide and nitride, respectively.

If facets are formed on a ridge of a cutting edge in a processing method according to the present invention, the ridge of the cutting edge has high cutting ability and high mechanical durability. This is because the following two effects are achieved at the same time:

only the angle of the tip of the ridge of the cutting edge is increased without decreasing (or on the contrary by improving) the actual sharpness of the ridge of the cutting edge; and various defects including small cracks and scratches on the surfaces of the cutting edge including the facets are removed.

In the following, an embodiment of the present invention will be specifically described.

In the first place, as an apparatus for performing a method of processing a ridge of a cutting edge according to the present invention, the GCIB apparatus described in the following Literature 1 can be used, for example.

Literature 1: Japanese Registered Patent No. 3994111

A general configuration of the GCIB apparatus described in Literature 1 will be described below.

A raw material gas is injected through a nozzle into a cluster generation chamber with the condition of a vacuum, in which the gas molecules are aggregated to generate a cluster. The clusters are guided as a gas cluster beam into an ionization chamber through a skimmer. In the ionization chamber, an ionizer applies an electron beam, such as of thermoelectrons, to ionize the neutral cluster. The ionized gas cluster beam is accelerated by an acceleration electrode. The incident gas cluster ion beam is reduced by an aperture to a predetermined beam diameter and then applied to a surface of a sample. In the case of planarizing a surface of a sample made of an electrically insulator, the gas cluster ion may be neutralized with electrons in advance. The angle at which the ridge of the cutting edge is irradiated with the gas cluster ion beam can be controlled by inclining the sample. In addition, the sample can be irradiated with the gas cluster ion beam in any direction by moving the sample in the longitudinal direction or lateral direction by means of an X-Y stage or rotating the sample by means of a rotating mechanism.

Example 1

To fabricate a diamond cutting tool, a block having a length of 2 mm, a width of 2 mm and a thickness of 1 mm was cut from a single-crystal diamond material by laser beam machining. The surfaces of the block were ground and shaped with a diamond wheel, and the cutting edge part was polished and finished with a scaif. The angle of the cutting edge was 65 degrees, and the radius of curvature of the tip of the cutting edge was about 50 nm. The surface roughness of the two surfaces forming the cutting edge was measured in a 10-μm square with an atomic force microscope: the arithmetic mean roughness Ra was 2 nm, and the maximum height Rz of the profile was 100 nm.

Figure 8:
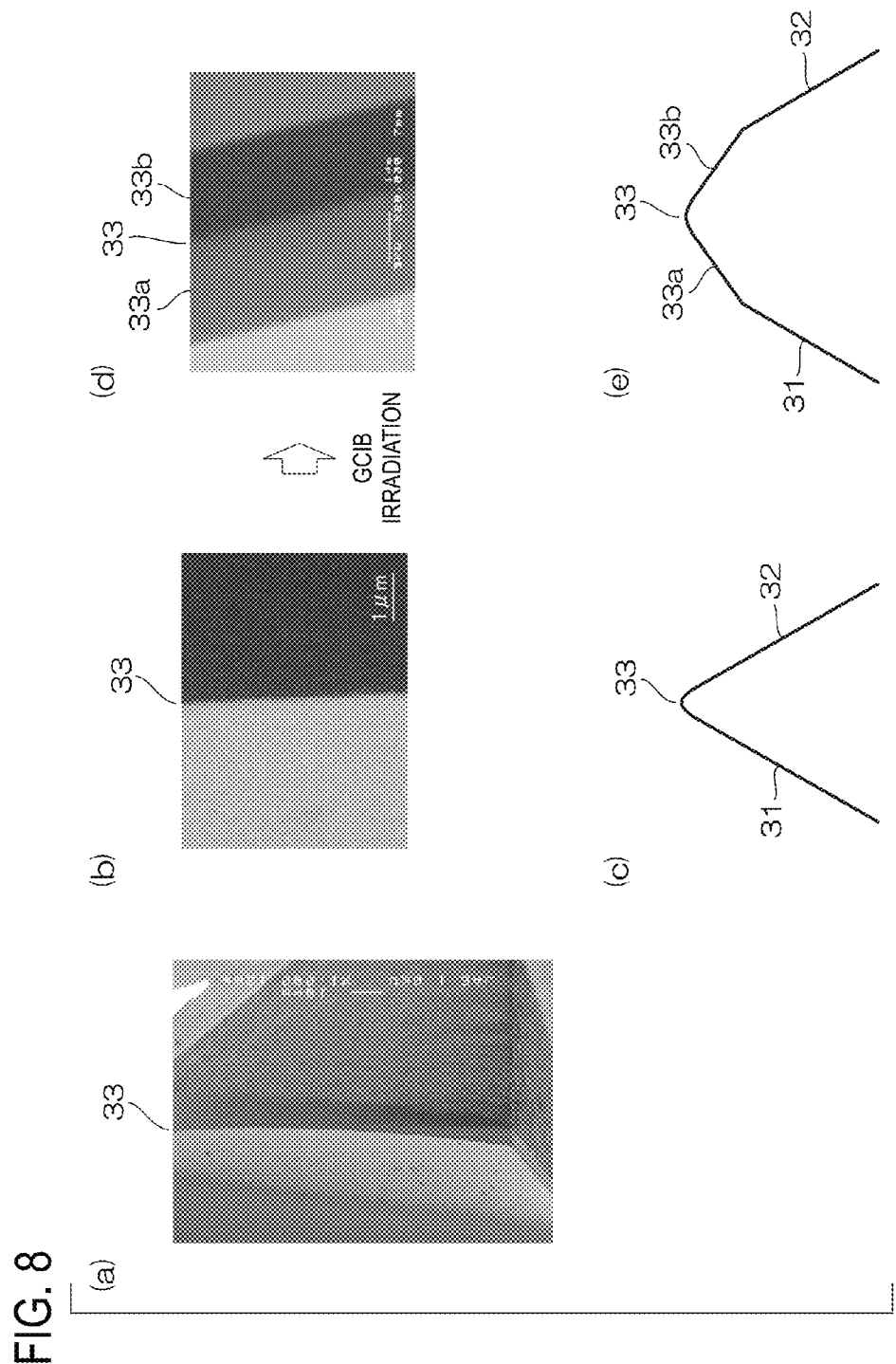

The cutting edge was irradiated with GCIB at such an angle that the two surfaces forming the cutting edge were both irradiated with the single GCIB at an angle of 147.5 degrees. The irradiation angles will be described with reference to FIG. 6(a). The angle of the surface 31 of the cutting edge with respect to the direction of irradiation with the GCIB (shown by the arrow) and the angle of the surface 32 of the cutting edge with respect to the direction of irradiation with the GCIB were both 147.5 degrees. In addition, the angle of the ridge of the cutting edge 33 with respect to the direction of irradiation with the GCIB was a right angle. In this way, the two surfaces forming the cutting edge and the ridge of the cutting edge can be irradiated with the single GCIB at the same time in such a manner that the two surfaces forming the cutting edge are not perpendicularly but obliquely irradiated with the GCIB. In addition, a part of the ridge of the cutting edge 33 close to the apex thereof is perpendicularly irradiated with the GCIB. The two facets are formed on the opposite sides of the part perpendicularly irradiated with the GCIB. The raw material gas used was argon, the acceleration voltage was 20 kV, and the irradiation dose was $3 \times 10^{18}$ ions/cm$^2$. FIG. 8 show results of observation of the ridge of the cutting edge before and after irradiation with a scanning electron microscope.

FIG. 8(a) is a picture showing the ridge of the cutting edge 33 before irradiation with the GCIB observed from above, and FIG. 8(b) is a picture showing an enlarged view of FIG. 8(a). FIG. 8(d) is a picture showing the ridge of the cutting edge 33 after irradiation with the GCIB. FIGS. 8(c) and 8(e) are side views of the ridge of the cutting edge 33 shown in FIGS. 8(b) and 8(d), respectively. As can be seen from the picture of FIG. 8(d), the two facets 33a and 33b were formed on the ridge of the cutting edge 33. The width of the facets 33a and 33b was 0.6 µm.

Figure 9:
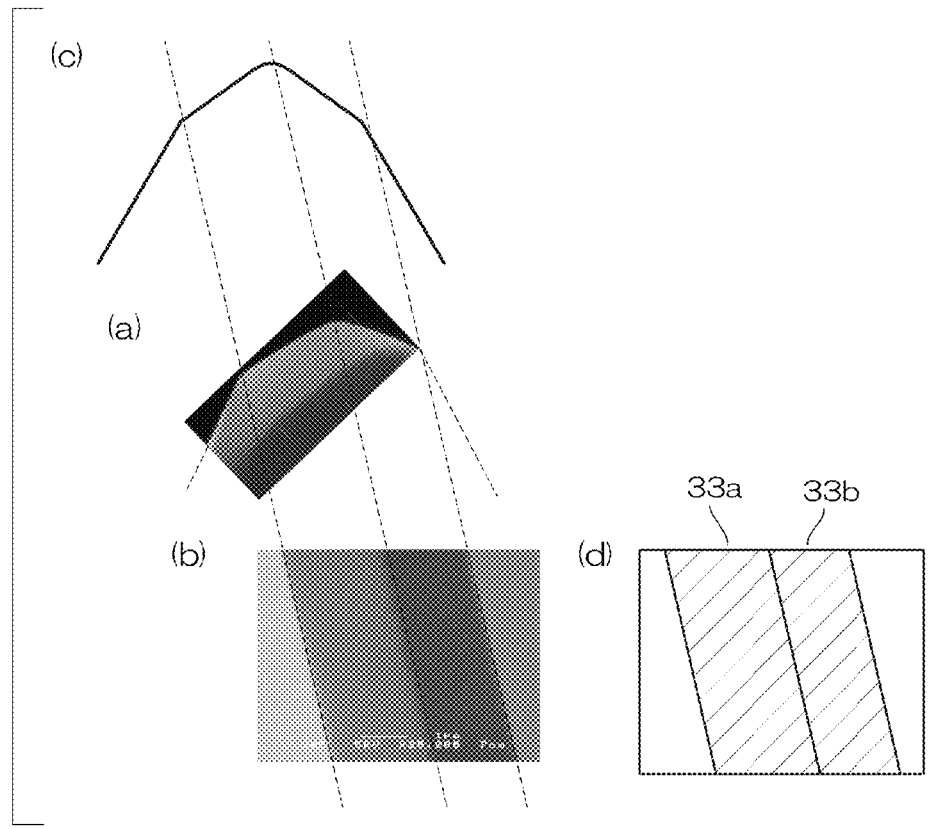
Figure 10:
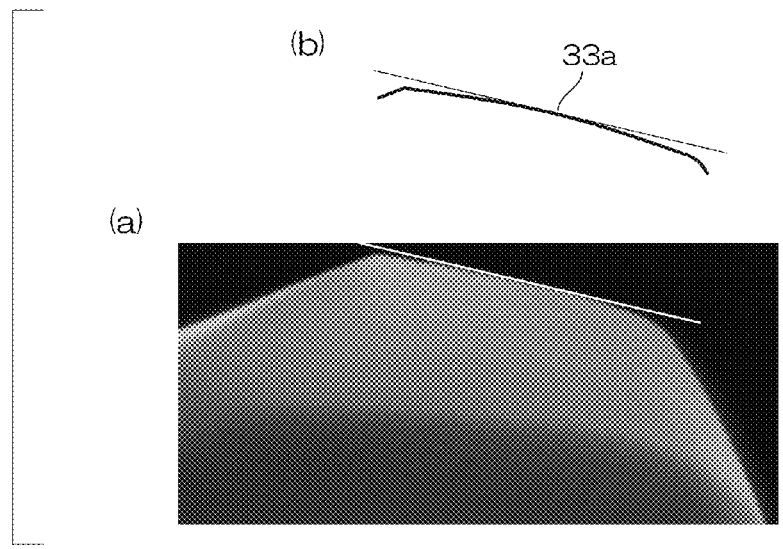

FIG. 9 are pictures and sketches corresponding to the pictures showing a state of the ridge of the cutting edge 33 after irradiation with the GCIB, as with FIGS. 8(d) and 8(e). FIG. 10(a) is an enlarged view of the picture of FIG. 9(a). FIG. 9(c) is a sketch of the picture of FIG. 9(a). As can be seen from FIGS. 10(a) and 10(b), parts of the facets were curved surfaces.

A sliding test of this cutting edge was performed with a sliding tester. The cutting edge was pressed against a quartz block with a load of 100 grams and made to slide back and forth a distance of 10 mm, 100 times at a rate of 60 cpm. Then, the ridge of the cutting edge was observed and checked for the presence of a chipping, but there was no chipping observed. The cut in the quartz block was also observed. The cut was extremely sharp and had no chip.

Comparative Example 1

A sample was fabricated in the same manner as in Example 1 except that the irradiation with the GCIB was not performed, and the sliding test was performed on the sample. The ridge of the cutting edge was observed, and there were many chippings observed. The cut in the quartz block was sharp, but there were chips observed.

Comparative Example 2

A sample was fabricated in the same manner as in Example 1 except that the irradiation with the GCIB was not performed, and then, two facets were formed by scaif polishing. The width of the facets was 1 µm. The facets were formed as a smooth flat surface. Then, the same sliding test as in Example 1 was performed. The ridge of the cutting edge was observed, and there were a smaller number of chippings observed than in Comparative Example 1. The cut in the quartz block was not sharp, and there were chips observed.

Example 2

A sample was fabricated in the same manner as in Example 1 except for the irradiation angle of the GCIB, and the sliding test was performed. The fabricated cutting edge was irradiated with the GCIB in such a manner that the two surfaces forming the cutting edge were irradiated with the GCIB at an angle of 117.5 degrees and an angle of 177.5 degrees. Two facets were formed on the tip of the cutting edge, and the facet formed on the surface irradiated with the GCIB at 117.5 degrees had a greater width of 0.8 µM. The width of the facet formed on the surface irradiated with the GCIB at 177.5 degrees was 0.4 µm. The result of the sliding test showed that no chipping was observed on the ridge of the cutting edge. The cut in the quartz block was extremely sharp, and there was no chip observed.

Comparative Example 3

A sample was fabricated in the same manner as in Example 1 except that the irradiation with the GCIB was not performed. Then, a polycrystalline diamond film having a thickness of 10 µm was deposited by a CVD process. The roughness of the polycrystalline diamond film was measured in a 10-µm square with an atomic force microscope: the arithmetic mean roughness Ra was 120 nm, and the maximum height Rz of the profile was 1.1 µm. Then, irradiation with the GCIB was performed in the same manner as in Example 1. No facet was formed on the ridge of the cutting edge. The result of the sliding test showed that chippings were observed on the ridge of the cutting edge, and there were many chips observed in the cut in the quartz block.

Example 3

A sample was fabricated in the same manner as in Example 1 except that the irradiation with the GCIB was not performed. Then, a diamond-like carbon film having a thickness of 10 µm was deposited by a CVD process. The roughness of the diamond-like carbon film was measured in a 10-µm square with an atomic force microscope: the arithmetic mean roughness Ra was 3 nm, and the maximum height Rz of the profile was 0.5 µm. Then, irradiation with the GCIB was performed in the same manner as in Example 1. Two facets were formed on the ridge of the cutting edge and both had a width of 0.3 µm. The result of the sliding test showed that no chipping was observed on the ridge of the cutting edge. The cut in the quartz block was extremely sharp, and there was no chip observed.

Example 4

A sample was fabricated in the same manner as in Example 1 except that the sample was not made of the single-crystal diamond material but a binderless cBN (cubic boron nitride) material. The surface roughness of the two surfaces forming the cutting edge before irradiation with the GCIB was measured in a 10-µm square with an atomic force microscope: the arithmetic mean roughness Ra was 4 nm, and the maximum height Rz of the profile was 300 nm. Two facets were formed on the ridge of the cutting edge by irradiation with the GCIB. The width of the facets was 0.6 µm. Parts of the facets were curved surfaces.

The sliding test of this cutting edge was performed with a sliding tester. There was no chipping observed on the ridge of the cutting edge. The cut in the quartz block was extremely sharp and had no chip or the like.

Example 5

The same processing test as in Example 1 was performed for various materials. The materials used for the test were sintered diamond, a superhard material, single-crystal silicon and quartz glass. For all the materials, facets similar to those in Example 1 were formed on the ridge of the cutting edge.

Example 6

As in Example 1, to fabricate a sintered diamond tool and a cBN tool, a block having a length of 2 mm, a width of 2 mm and a thickness of 1 mm was cut from each of a sintered diamond material and a cBN material by laser beam machining. Then, the surfaces of the blocks were ground and shaped with a diamond wheel, and the cutting edge parts were polished and finished with a scaif. In this process, samples that differ in surface roughness in terms of the maximum height Rz of the profile were fabricated by changing the scaif polishing conditions. The maximum height Rz of the profile of the fabricated samples ranged from 100 nm to 2 μm. These samples were irradiated with the GCIB in the same manner as in Example 1. The cutting edges were observed for formation of facets. Then, for the tools made of both the materials facets were formed on the samples whose Rz is equal to or smaller than 1 μm, while no facet was formed on the samples whose Rz is greater than 1 μm.

Example 7

Samples were fabricated in the same manner as in Example 1 except that the combination of the material of the tool and the raw material gas of the GCIB was varied, and the relationship between the facet width and the etching amount of the surface of the cutting edge was examined. The following is the result.

| MATERIAL OF TOOL | RAW MATERIAL GAS | FACET WIDTH (μm) | ETCHING AMOUNT (μm) |
| --- | --- | --- | --- |
| SILICON | ARGON | 0.7 | 0.1 |
| SILICON | $SF_6$ | 0.8 | 1.2 |
| SILICON | OXYGEN | 0.6 | 1.1 |
| SILICON | NITROGEN | 0.6 | 1.0 |
| SILICA GLASS | OXYGEN | 0.7 | 0.1 |
| SILICA GLASS | NITROGEN | 0.6 | 1.0 |
| SILICA GLASS | ARGON | 0.5 | 0.1 |
| SILICON NITRIDE | NITROGEN | 0.6 | 0.1 |
| SILICON NITRIDE | OXYGEN | 0.5 | 1.1 |

Example 8

The same processing test as in Example 1 was performed except that the maximum height Rz of the profile of the two surfaces forming the cutting edge was 1.2 μm, and a processing of planarizing the surfaces of the cutting edge by GCIB irradiation was additionally performed. First, the maximum height Rz of the profile of the surfaces forming the cutting edge was reduced to 0.5 μm by the planarization processing. After that, the same process as in Example 1 was performed. Two facets were formed on the ridge of the cutting edge of the processed sample, and both the facets had a width of 0.3 μM. The result of the sliding test showed that no chipping was observed on the ridge of the cutting edge, and the cut in the quartz block was extremely sharp and had no chip.

Example 9

The present invention was applied to a cutting tool (made of single-crystal diamond) of a commercially available glass scriber. The result was that the life of the tool was three times longer than the conventional tool to which the present invention was not applied.

The examples and comparative examples described above show the following conclusions.

From Example 1 and Comparative Example 1, it can be seen that, if the ridge of the cutting edge is irradiated with GCIB to form facets, no chipping occurs on the ridge of the cutting edge, and the mechanical durability is remarkably improved. In addition, it can also be seen that the processing quality of the processed material is improved.

From Example 1 and Comparative Example 2, it can be seen that, if facets are formed in other processes than GCIB irradiation, the mechanical durability of the ridge of the cutting edge is not improved. That is, the effect of the present invention is not achieved only by forming facets on the ridge of the cutting edge.

From Example 1 and Example 2, it can be seen that the width of the two facets formed or other factors can be controlled by changing the direction of GCIB irradiation.

From Example 1, Example 3 and Example 8, it can be seen that, if the chemical reactivity of the material of the cutting edge with the GCIB is reduced, facets can be formed with a low etching amount of the material of the cutting edge.

From Example 1, Example 4, Example 7 and Comparative Example 3, it can be seen that, if the maximum height Rz of the profile of the surface of the cutting edge is greater than 1 μm, no facet is formed even if the irradiation with the GCIB is performed, and the mechanical durability of the ridge of the cutting edge is not improved.

From Example 1 and Examples 4 to 6, it can be seen that, regardless of the material of the cutting edge, facets are formed on the cutting edge by GCIB irradiation. This is probably because the asymmetry and distance of the lateral movement of the substance on the edge caused by the GCIB irradiation do not depend on the material and is consistent with the conventionally known mechanism of crater formation by GCIB irradiation.

From Example 1 and Example 9, it can be seen that, even if the maximum height Rz of the profile of the surface of the cutting edge is greater than 1 μM, if the maximum height Rz of the profile is reduced to be equal to or smaller than 1 μm by GCIB irradiation, the present invention can be applied to form facets, and the effect of the present invention can be achieved.

It is obvious that any design factors including the conditions of the GCIB irradiation and various conditions concerning the materials are possible as far as the principle and mechanism of the present invention can work.

The foregoing description of the embodiments of the invention has been presented for the purpose of illustration and description. It is not intended to be exhaustive or to limit the invention to the precise form disclosed. Modifications or variations are possible in light of the above teachings. The embodiment was chosen and described to provide the illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of processing a ridge of a cutting edge, a maximum height of a profile of two surfaces forming the cutting edge being equal to or smaller than 1 μm, and the ridge of the cutting edge existing along a boundary between the two surfaces intersecting with each other, the method comprising:
    newly forming at least one facet on said ridge of the cutting edge by irradiating simultaneously said two surfaces and said ridge of the cutting edge with a gas cluster ion beam in such a manner that said two surfaces are not perpendicularly but obliquely irradiated with the gas cluster ion beam, and at least a part of said ridge of the cutting edge is perpendicularly irradiated with the gas cluster ion beam.

2. The method of processing a ridge of a cutting edge according to claim 1, wherein said two surfaces the maximum height of the profile of which is equal to or smaller than 1 μm are surfaces planarized by irradiation with the gas cluster ion beam.

3. The method of processing a ridge of a cutting edge according to claim 1 or 2, wherein a gas of said gas cluster ion beam is a gas that does not chemically react with a material of said cutting edge.

4. The method of processing a ridge of a cutting edge according to claim 3, wherein said gas is any of argon, oxygen, nitrogen, carbon dioxide or a combination thereof.

5. The method of processing a ridge of a cutting edge according to claim 1, wherein the at least one facet comprises a plurality of facets.

6. The method of processing a ridge of a cutting edge according to claim 1, wherein at least a part of said at least one facet is a curved surface.

7. The method of processing a ridge of a cutting edge according to claim 5, wherein at least a part of at least one of said plurality of facets is a curved surface.

* * * * *